United States Patent
Zanzig et al.

(10) Patent No.: US 6,894,122 B2
(45) Date of Patent: May 17, 2005

(54) TIRE WITH COMPONENT OF RUBBER COMPOSITION COMPRISED OF A COMBINATION OF FUNCTIONALIZED EMULSION SBR AND COUPLED SOLUTION SBR

(75) Inventors: David John Zanzig, Bertrange (LU); Brian David Holden, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 89 days.

(21) Appl. No.: 10/651,696

(22) Filed: Aug. 29, 2003

(65) Prior Publication Data

US 2004/0054062 A1 Mar. 18, 2004

Related U.S. Application Data

(60) Provisional application No. 60/411,230, filed on Sep. 17, 2002.

(51) Int. Cl.$^7$ ................................................. C08F 36/04
(52) U.S. Cl. ............................ 525/331.9; 525/333.1; 525/192; 525/232; 525/237; 524/495; 524/492; 152/209.1
(58) Field of Search ..................... 524/495, 492; 525/331.9, 333.1, 192, 232, 237; 152/209.1

(56) References Cited

U.S. PATENT DOCUMENTS

| | | | |
|---|---|---|---|
| 4,150,014 A | 4/1979 | Edwards et al. ......... 260/42.32 |
| 4,150,015 A | 4/1979 | Edwards et al. ......... 260/42.37 |
| 4,152,308 A | 5/1979 | Edwards et al. ............... 260/23 |
| 4,357,432 A | 11/1982 | Edwards ..................... 523/351 |
| 5,916,957 A * | 6/1999 | Itoh et al. ................... 524/496 |
| 6,090,880 A * | 7/2000 | Zimmer et al. ............. 524/492 |
| 6,548,578 B2 * | 4/2003 | Pawlikowski ................ 524/47 |
| 2002/0120052 A1 * | 8/2002 | Wendling et al. ........... 524/495 |

OTHER PUBLICATIONS

KR 2001–17712 (abstract in English only).*

* cited by examiner

Primary Examiner—David W. Wu
Assistant Examiner—Rip A. Lee
(74) Attorney, Agent, or Firm—Henry C. Young, Jr.

(57) ABSTRACT

This invention relates to a tire having at least one component (e.g. tread) of a rubber composition comprised of a carbon black and precipitated silica reinforced elastomer blend comprised of a combination of hydroxyl functionalized aqueous emulsion polymerization prepared styrene/butadiene copolymer elastomer (E-SBR) and tin coupled organic solvent solution polymerization prepared styrene/butadiene copolymer elastomer (S-SBR) and/or isoprene/butadiene copolymer elastomer. Preferably, said E-SBR is exclusive of functional groups reactive with alkoxy groups other than said hydroxyl functional groups. A coupling agent as bis(3-triethoxysilylpropyl)polysulfide having an average of from only 2 to 2.6 connecting sulfur atoms in its polysulfidic bridge is used. The invention further relates to an article of manufacture, such as for example a tire, having at least one component of a rubber composition comprised of said elastomer blend.

14 Claims, No Drawings

TIRE WITH COMPONENT OF RUBBER COMPOSITION COMPRISED OF A COMBINATION OF FUNCTIONALIZED EMULSION SBR AND COUPLED SOLUTION SBR

The Applicants hereby incorporate by reference prior U.S. Provisional Application Ser. No. 60/411,230, filed on Sep. 17, 2002.

FIELD OF THE INVENTION

This invention relates to a tire having at least one component (e.g. tread) of a rubber composition comprised of a carbon black and precipitated silica reinforced elastomer blend comprised of a combination of hydroxyl functionalized aqueous emulsion polymerization prepared styrenelbutadiene copolymer elastomer (E-SBR) and tin coupled organic solvent solution polymerization prepared styrene/butadiene copolymer elastomer (S-SBR) and/or isoprene/butadiene copolymer elastomer. Preferably, said E-SBR is exclusive of functional groups reactive with alkoxy groups other than said hydroxyl functional groups. A coupling agent as bis(3-triethoxysilylpropyl)polysulfide having an average of from only 2 to 2.6 connecting sulfur atoms in its polysulfidic bridge is used. The invention further relates to an article of manufacture, such as for example a tire, having at least one component of a rubber composition comprised of said elastomer blend.

BACKGROUND OF THE INVENTION

Vehicular tires, particularly pneumatic tires, are sometimes provided with a component, such as for example a tread, which is comprised of a rubber composition which contains particulate silica reinforcement, particularly synthetic amorphous precipitated silica.

The rubber composition of the component my also contain a silica coupling agent to aid in enhancing the reinforcing effect of the silica for the respective elastomer(s) of the rubber composition such as, for example, a tire tread.

Use of such precipitated silica reinforcement and associated coupling agent is well known to those having skill in such art.

A combination of various such hydroxyl functionalized elastomers and silica are variously disclosed in U.S. Pat. Nos. 4,150,014, 4,150,015, 4,152,308 and 4,357,432 and is therefore well known to those having skill in such art.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

The term "phr" where used herein, and according to conventional practice, refers to "parts of a respective material per 100 parts by weight of rubber, or elastomer".

The Tg of an elastomer, if referred to herein, refers to a "glass transition temperature" of the elastomer which can conveniently be determined by a differential scanning calorimeter at a heating rate of 10° C. per minute.

SUMMARY AND PRACTICE OF THE INVENTION

In accordance with this invention, a tire is provided having at least one component comprised of a rubber composition which comprises, based on parts by weight per 100 parts by weight of rubber (phr):

(A) 100 phr of elastomers comprised of (1) about 10 to about 95, alternatively about 25 to about 75, phr of aqueous emulsion polymerization derived styrene/butadiene copolymer elastomer which contains pendent hydroxyl groups, wherein said elastomer contains from about 15 to about 28 weight percent bound styrene, and, correspondingly, (2) from about 5 to about 90, alternately about 25 to about 75, phr of a tin coupled organic solvent solution polymerization derived elastomer selected from at least one of styrenelbutadiene copolymer containing from about 15 to about 28 weight percent bound styrene and isoprene/butadiene copolymer containing from about 10 to about 20 weight percent units derived from isoprene and which does not contain pendent hydroxyl groups, (B) about 25 to about 95, alternately about 35 to about 90, phr reinforcing filler selected from carbon black, precipitated silica and silica-containing carbon black having domains of silica on its surface, preferably aggregates of precipitated silica, wherein said precipitated silica and silica domains on said carbon black contain hydroxyl groups (e.g. silanol groups) on their surfaces, wherein said reinforcing filler is comprised of (1) about 35 to about 75 phr of carbon black and about 5 to about 20 phr of said silica-containing material, or (2) about 5 to about 30 phr of carbon black and about 35 to about 90 phr of said precipitated silica and/or said silica-containing carbon black, and (C) at least one silica coupling agent having a moiety reactive with hydroxyl (e,g, silanol groups) on the surface of the said precipitated silica and on the surface of said silica domains on the surface of said silica-containing carbon black, and an additional moiety interactive with the said elastomer(s), wherein said coupling agent is bis(3-triethoxysilylpropyl)polysulfide having an average of from 2 to 2.6 connecting sulfur atoms in its polysulfidic bridge.

A significant aspect of this invention is the tire component (e.g. a tire tread) of a rubber composition required to be comprised of the combination of emulsion polymerization prepared styrene/butadiene elastomer with pendent hydroxyl groups and a tin coupled elastomer without pendent hydroxyl groups together with carbon black and a silica based material (precipitated silica and/or carbon black having silica domains on its surface) and a restriction that an included coupling agent limited to a bis(3-triethoxysilylpropyl)polysulfide having an average of only from 2 to 2.6 connecting sulfur atoms in its polysulfidic bridge.

The tin coupled elastomer can be prepared, for example, made by anionic polymerization of the respective elastomer precursor monomers wherein the polymerization is terminated by the addition of a Group VIa metal coupling agent, such as a tin tetrahalide. The anionic polymerization may be initiated with a Group I or II metal, such as lithium, and is carried out for a length of time sufficient to permit substantially complete polymerization of monomers. In other words, the polymerization may be carried out until high conversions are attained at which time the polymerization may be terminated with a tin-based coupling agent.

The tin based coupling agent may be, for example, a tin halide, a lead halide, a germanium halide or a silicon halide. The halogen for the coupling agent may be fluorine, chlorine, bromine or iodine with chlorine being preferred.

Tin coupling agents, such as tin tetrachloride, tin tetrabromide, tin tetrachloride and tin tetraiodide may be preferred. The coupling agent will normally be a tetrahalide. However, trihalides or dihalides might be used. In cases where tin dihalides are utilized, a linear polymer rather than a branched polymer results. To induce a higher level of branching, tin tetrahalides are normally preferred.

Broadly, and exemplarily, a range of about 0.01 to 4.5 milliequivalents of the coupling agent may be employed per 100 grams of the rubbery monomer. In cases where a tin trihalide is used as the coupling agent, one mole of the tin trihalide may optimally be utilized for every three moles of live lithium ends. The tin coupling agent can be added to a polymer cement containing the living rubbery polymer in a hydrocarbon solution, e.g., in cyclohexane, with suitable mixing for distribution and reaction.

A tin coupled rubbery polymer that can optionally be utilized for the compositions of this invention can, for example, be symmetrically or asymmetrically coupled. A technique for preparing asymmetrically tin-coupled rubbery polymers is disclosed in U.S. Pat. No. 6,043,321, the teachings of which are incorporated herein by reference in their entirety. In this process, asymmetrical tin-coupled rubbery polymer having improved stability are made by a process that comprises:

(A) continuously polymerizing in a first reactor at least one diene monomer to a conversion of at least about 90 percent, utilizing an anionic initiator to produce a polymer cement containing living polydiene rubber chains;

(B) continuously feeding the polymer cement produced in the first reactor into a second reactor;

(C) adding a tin halide to the polymer cement in a second reactor under conditions of agitation to produce a polymer cement having the tin halide homogeneously dispersed therein, wherein the residence time in the second reactor is within the range of about 15 minutes to about 4 hours;

(D) continuously feeding the polymer cement having the tin halide homogeneously dispersed therein into a plug flow reactor having a residence time of about 15 minutes to about 1 hour to produce a polymer cement of the asymmetrically tin-coupled rubbery polymer; and (E) continuously withdrawing the polymer cement of the asymmetrically tin-coupled rubbery polymer from the plug flow reactor.

If desired, a portion of the precipitated silica and/or silica-treated carbon black, as case may be, is added to the rubber composition in one mixing step and the remainder added in a subsequent mixing step, in the same or separate rubber mixer.

In practice, the silica coupling agent is added subsequent to the final addition of the silica-containing material, preferably at least one minute subsequent to the addition of the silica.

In practice, the mixing steps for the blending of the elastomer(s), reinforcing filler(s) and coupler may, in general be conducted for a total mixing time for the total mixing steps in a range of about 3 to about 10 minutes. The mixing time for addition of the free sulfur vulcanizer, together with a vulcanizing accelerator and optionally with a vulcanization retarder, for a period of from 1.5 to about 4 minutes.

In one aspect of the invention, it may be desired for the precipitated silica to be in a minority insofar as the carbon black and silica reinforcement is concerned for various purposes which may, for example, be to endeavor to maximize wear resistance of the tread rubber composition.

In another aspect of the invention, it may be desired for the precipitated silica to be in a majority insofar as the carbon black and silica reinforcement is concerned for various purposes which may, for example, be to endeavor to maximize a reduction of rolling resistance and to maximize wet skid performance for the tire itself.

The precipitated silica for use as reinforcement for this invention is intended herein to include precipitated aluminosilicates. Such precipitated silica may be prepared, for example, by controlled acidification of a soluble silicate, e.g., sodium silicate or a combination of silicate and aluminate in the case of aluminosilicates and such silica preparation is, in general, well known to those skilled in the precipitated silica preparation art.

In general, the precipitated silica is a form of aggregates of primary silica particles and have a BET surface area within a range of about 80 to about 300, preferably about 120 to about 180, $m^2/g$ and a DBP (dibutyl phthalate) value within a range of about 100 to about 350, preferably about 150 to about 300 $m^2/g$.

A BET method of measuring surface area is described in the *Journal of the American Chemical Society*, Volume 60, Page 304 (1930).

Various commercially-available precipitated silicas may be considered for use in the tread of this invention, particularly the tread cap such as, for example only and without limitation, silica from Rhodia such as, for example, Zeosil 1165MP and Zeosil 165GR, silica from Degussa AG with designations such as, for example, 3370GR, and silica from J. M. Huber such as, for example, Zeopol 8745 and silica from PPG Industries such as, for example, HiSil 210.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silica, and plasticizers, fillers, pigments, fatty acid, zinc oxide, waxes, antioxidants and antiozonants and peptizing agents. As known to those skilled in the art, depending on the intended use of the sulfur-vulcanizable and sulfur-vulcanized material (rubbers), the additives mentioned above are selected and commonly used in conventional amounts.

Typical additions of carbon black, silica and silica coupler for this invention are hereinbefore set forth.

In practice, the tire, as a manufactured article, may be prepared by shaping and sulfur curing the assembly of its components at an elevated temperature (e.g. 140° C. to about 160° C.) and elevated pressure in a suitable mold. Such practice is well known to those having skill in such art.

Thus, in a more specific aspect of this invention, a tire is provided having a tread component, namely an outer, circumferential tread intended to be ground-contacting, comprised of a rubber composition prepared according to this invention.

Representative of various additional conjugated diene-based elastomers for use in this invention include, for example, cis 1,4-polyisoprene rubber (natural or synthetic), cis 1,4-polybutadiene, high vinyl polybutadiene having a vinyl 1,2 content in a range of about 30 to about 90 percent, styrene/butadiene copolymers (SBR) including emulsion polymerization prepared SBR and organic solvent polymerization prepared SBR, styrene/isoprene/butadiene terpolymers, a minor amount of 3,4-polyisoprene if used, isoprene/butadiene copolymers, isoprene/styrene copolymers, acrylonitrile/butadiene copolymers, acrylonitrile/butadiene/styrene terpolymers, For convenience, said acrylonitrile/diene polymers are referred to as diene-based elastomers even though the diene might not be a major component of the elastomer.

Representative of rubber reinforcing carbon blacks for the tire tread rubber composition are those, for example, having an Iodine value (ASTM D1510) in a range of about 80 to about 160, alternatively about 100 to about 150, g/kg together with a DBP (dibutylphthalate) value (ASTM D2414) in a range of about 70 to about 200, alternatively about 100 to about 150 cm$^3$/100 g. Representative of such carbon blacks can easily be found in *The Vanderbilt Rubber Handbook*, 1978 edition, Page 417.

It is readily understood by those having skill in the art that the rubber composition would be compounded by methods generally known in the rubber compounding art, such as mixing the various sulfur-vulcanizable constituent rubbers with various commonly used additive materials such as, for example, curing aids such as sulfur, activators, retarders and accelerators, processing additives, such as oils, resins including tackifying resins, and plasticizers, non-reinforcing fillers, pigments, fatty acid, zinc oxide, waxes, antioxidants and antiozonants, peptizing agents. As known to those skilled in the art, depending on the intended use of the sulfur vulcanizable and sulfur-vulcanized material (rubbers), the additives mentioned above are selected and commonly used in conventional amounts.

Typical amounts of reinforcing fillers for this invention are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook*, (1978), Pages 344 through 346. Typical amounts of antiozonants comprise about 1 to 5 phr. Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention which is more primarily directed to a tire with a component (e.g. tread) comprised of the prescribed rubber composition.

The mixing of the rubber composition can be accomplished by methods known to those having skill in the rubber mixing art. For example, the ingredients may be mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art.

The invention may be better understood by reference to the following examples in which the parts and percentages are by weight unless otherwise indicated.

While various embodiments are disclosed herein for practicing the invention, it will be apparent to those skilled in this art that various changes and modifications may be made therein without departing from the spirit or scope of the invention.

What is claimed is:

1. A tire having at least one component comprised of a rubber composition which comprises, based on parts by weight per 100 parts by weight of rubber (phr):
   (A) 100 phr of elastomers comprised of
      (1) about 10 to about 95 phr of aqueous emulsion polymerization derived styrene/butadiene copolymer elastomer which contains pendent hydroxyl groups, wherein said elastomer contains from about 15 to about 28 weight percent bound styrene, and,
      (2) about 5 to about 90 phr of a tin coupled organic solvent solution polymerization derived elastomer selected from at least one of styrene/butadiene copolymer containing from about 15 to about 28 weight percent bound styrene or isoprene/butadiene copolymer containing from about 10 to about 20 weight percent units derived from isoprene and which does not contain pendent hydroxyl groups,
   (B) about 25 to about 95 phr reinforcing filler selected from carbon black, precipitated silica and silica-containing carbon black having domains of silica on its surface, wherein said precipitated silica and silica domains on said carbon black contain hydroxyl groups on their surfaces;
   wherein said reinforcing filler is comprised of
      (1) about 35 to about 75 phr of carbon black and about 5 to about 20 phr of at least one of said precipitated silica or silica-containing carbon black, or
      (2) about 5 to about 30 phr of carbon black and about 35 to about 90 phr of at least one of said precipitated silica and said silica-containing carbon black, and
   (C) at least one silica coupling agent having a moiety reactive with hydroxyl on the surface of the said precipitated silica and on the surface of said silica domains on the surface of said silica-containing carbon black, and an additional moiety interactive with the said elastomer(s), wherein said coupling agent is bis (3-triethoxysilylpropyl) polysulfide having an average of from 2 to 2.6 connecting sulfur atoms in its polysulfidic bridge.

2. The tire of claim 1 wherein said rubber composition is comprised of:
(A) elastomers comprised of
  (1) about 25 to about 75 phr of aqueous emulsion polymerization derived styrene/butadiene copolymer elastomer which contains pendent hydroxyl groups, wherein said elastomer contains from about 15 to about 28 weight percent bound styrene, and,
  (2) about 25 to about 75 phr of a tin coupled organic solvent solution polymerization derived styrene/butadiene copolymer containing from about 15 to about 28 weight percent bound styrene which does not contain pendent hydroxyl groups,
(B) about 25 to about 95 phr reinforcing filler selected from carbon black and precipitated silica, wherein said precipitated silica contains hydroxyl groups on its surface;
wherein said reinforcing filler is comprised of:
  (1) about 35 to about 75 phr of carbon black and about 5 to about 20 phr of said precipitated silica, or
  (2) about 5 to about 30 phr of carbon black and about 35 to about 90 phr of said precipitated silica, and
(C) at least one silica coupling agent having a moiety reactive with hydroxyl on the surface of the said precipitated silica, and an additional moiety interactive with the said elastomer(s), wherein said coupling agent is bis(3-triethoxysilylpropyl) polysulfide having an average of from 2 to 2.6 connecting sulfur atoms in its polysulfidic bridge.

3. The tire of claim 2 wherein said reinforcing filler is comprised of about 35 to about 75 phr of carbon black and about 5 to about 20 phr of precipitated silica.

4. The tire of claim 2 wherein said reinforcing filler is comprised of about 5 to about 30 phr of carbon black and about 35 to about 95 phr of said precipitated silica.

5. The tire of claim 1 wherein said rubber composition comprises, based on parts by weight per 100 parts by weight of rubber (phr):
(A) 100 phr of elastomers comprised of
  (1) about 25 to about 75, phr of aqueous emulsion polymerization derived styrene/butadiene copolymer elastomer which contains pendent hydroxyl groups, wherein said elastomer contains from about 15 to about 28 weight percent bound styrene, and,
  (2) about 25 to about 75, phr of a tin coupled organic solvent solution polymerization derived elastomer comprised of an isoprene/butadiene copolymer containing from about 10 to about 20 weight percent units derived from isoprene and which does not contain pendent hydroxyl groups,
(B) about 25 to about 95 phr reinforcing filler selected from carbon black, precipitated silica and silica-containing carbon black having domains of silica on its surface, preferably aggregates of precipitated silica, wherein said precipitated silica and silica domains on said carbon black contain hydroxyl groups on their surfaces;
wherein said reinforcing filler is comprised of
  (1) about 35 to about 75 phr of carbon black and about 5 to about 20 phr of precipitated silica, or
  (2) about 5 to about 30 phr of carbon black and about 35 to about 90 phr of said precipitated silica, and
(C) at least one silica coupling agent having a moiety reactive with hydroxyl on the surface of the said precipitated silica and an additional moiety interactive with the said elastomer(s), wherein said coupling agent is bis(3-triethoxysilylpropyl) polysulfide having an average of from 2 to 2.6 connecting sulfur atoms in its polysulfidic bridge.

6. The tire of claim 5 wherein said reinforcing filler is comprised of about 35 to about 75 phr of carbon black and about 5 to about 20 phr of precipitated silica.

7. The tire of claim 5 wherein said reinforcing filler is comprised of about 5 to about 30 phr of carbon black and about 35 to about 90 phr of said precipitated silica.

8. The tire of claim 1 wherein said component is a tire tread.

9. The tire of claim 2 wherein said component is a tire tread.

10. The tire of claim 3 wherein said component is a tire tread.

11. The tire of claim 4 wherein said component is a tire tread.

12. The tire of claim 5 wherein said component is a tire tread.

13. The tire of claim 6 wherein said component is a tire tread.

14. The tire of claim 7 wherein said component is a tire tread.

* * * * *